Aug. 17, 1937.　　　　A. STUMPF　　　　2,090,611
MOTOR TROUBLE FLOODLIGHT FOR MOTOR COMPARTMENTS
Filed April 2, 1936　　　　2 Sheets-Sheet 1
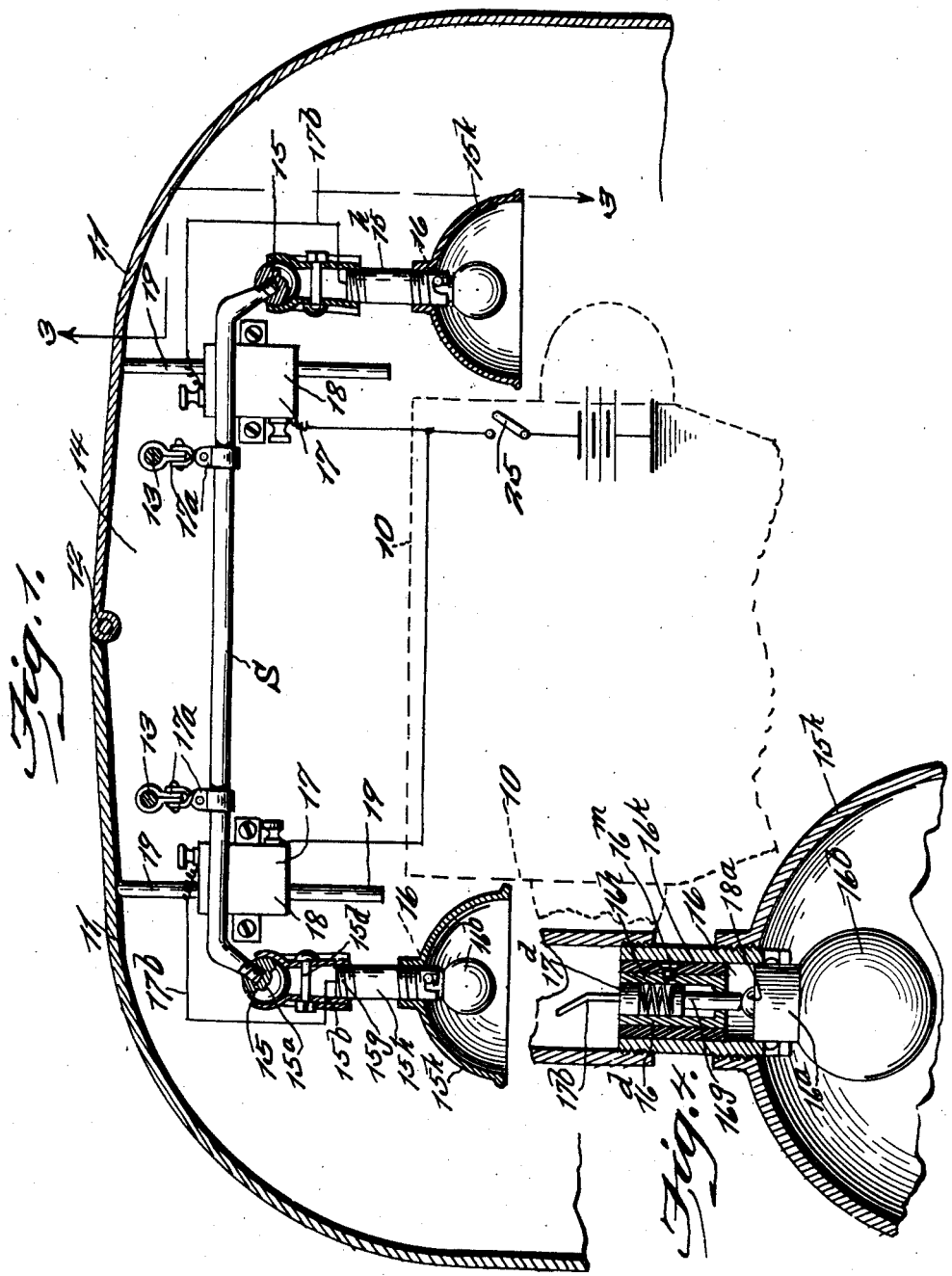
Albert Stumpf INVENTOR
BY R. A. Boswell ATTORNEY Aug. 17, 1937.  A. STUMPF  2,090,611
MOTOR TROUBLE FLOODLIGHT FOR MOTOR COMPARTMENTS
Filed April 2, 1936  2 Sheets-Sheet 2
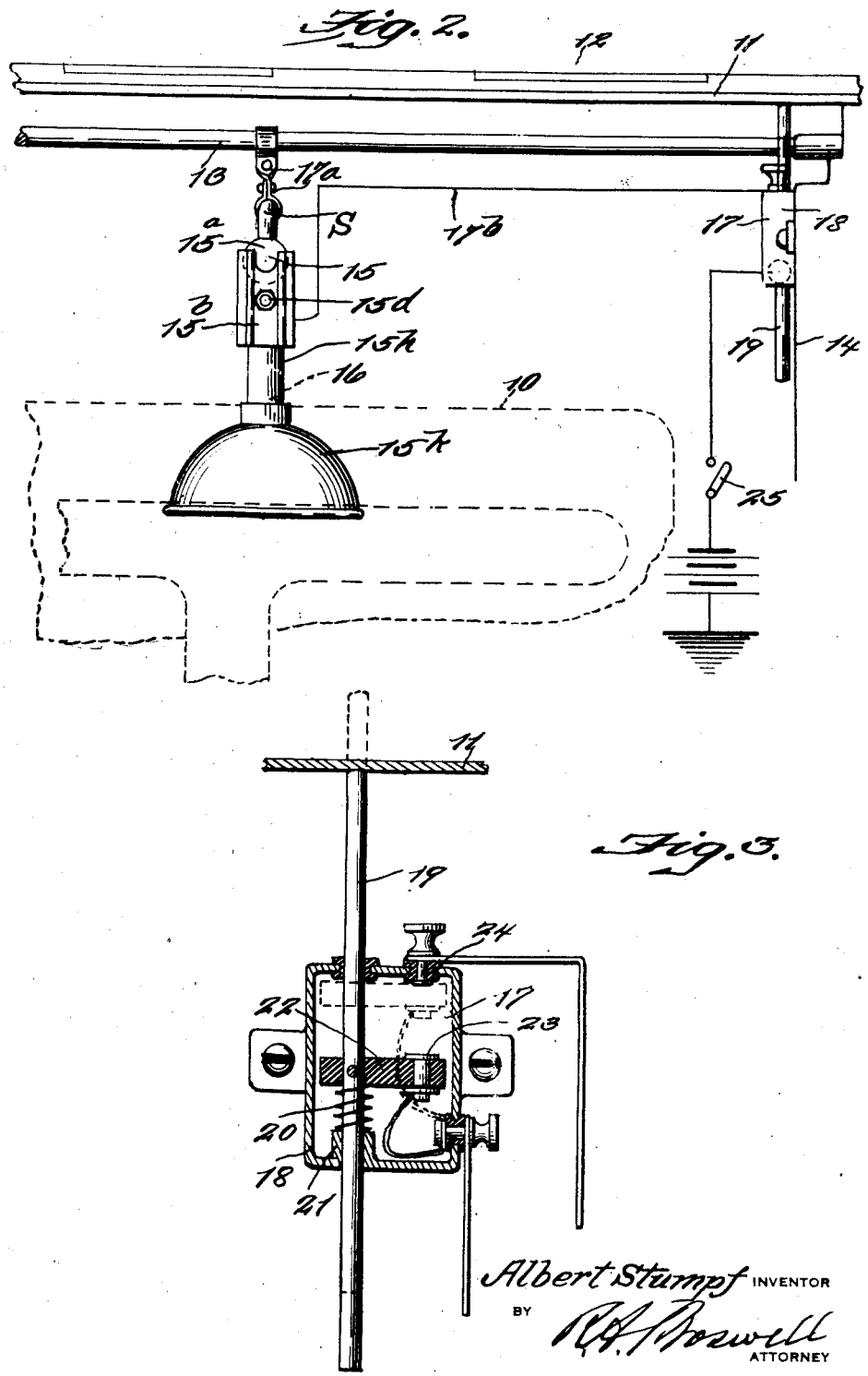

Patented Aug. 17, 1937

2,090,611

UNITED STATES PATENT OFFICE 2,090,611

MOTOR TROUBLE FLOODLIGHT FOR MOTOR COMPARTMENTS

Albert Stumpf, Philadelphia, Pa.

Application April 2, 1936, Serial No. 72,291

2 Claims. (Cl. 240—7.1)

This invention relates to automobile trouble lights and has for an important object thereof the provision of means whereby adequate illumination of the motor may be had by simply shifting the hood to inspect the same.

A further object of the invention is the provision of a device of this character which may be very cheaply and readily constructed and which may be readily applied to the vehicle in addition to being durable and efficient in service.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a fragmentary transverse sectional view through the motor compartment showing trouble lamps as constructed in accordance with the invention, installed therein.

Figure 2 is a fragmentary longitudinal section of the motor compartment.

Figure 3 is a detail sectional view of the switch illustrating the operation thereof, in dotted lines.

Figure 4 is a detail of the lamp mounting.

Referring now more particularly to the drawings, the numeral 10 generally designates the engine of an automobile, 11 hood sections centrally pivoted as at 12 for movement to open position exposing the engine from one side to the other of the car, and 13 designates the usual radiator brace rods extending between the forward face of the cowl partition 14 and the radiator, not herein shown.

In accordance with the invention a transversely extending support S is provided having at opposite ends thereof a ball and socket connection 15 for a lamp socket 16, the sockets preferably being of the reflector type as illustrated. The ball and socket connection 15 permits the lamp to be swung so that the light rays may be directed toward the front or toward the rear. The fact is, one lamp may be directed toward the rear, and the lamp on the other side of the motor may be positioned to direct the light rays toward the front. This support is preferably suspended from the radiator brace rods 13 by means of rod clamps 17a and is of sufficient length that the sockets 16 are disposed at opposite sides of the motor 10. The suspension means on the radiator brace rods 13 comprises upper and lower clamps identified by the reference characters 17a. It is possible to adjust the upper clamps longitudinally of the radiator brace rods 13, so that the suspension means may be moved forwardly or rearwardly, in which event the lamps may be positioned toward the front or to the rear. This is due to the fact that the friction of the upper clamps on the rods 13 is not so great as would prevent such adjustment. Furthermore, the rod S is capable of adjustment longitudinally through the lower clamps 17a as well as rotatable, due to the fact that the friction between the lower clamps and the rod S is not so great as would prevent this action. Also the lower clamps are capable of pivotal movement relative to the upper clamps, as the friction between the upper and lower clamps is not so great as would prevent such operation, in view of which the lower clamps may be rocked relative to the upper clamps, which would allow the lamps on both sides of the motor to be slightly rocked in order to direct the light rays toward the front or rear. The lamps employed are preferably of the single contact type and the sockets thereof are grounded to the engine frame through the transverse rod.

In combination with each lamp a plunger type switch 17 is employed. The switch as shown comprises a casing 18 through the upper and lower walls of which a rod or plunger 19 is directed, a spring 20 surrounding the rod between the end of the casing or collar 21 seated thereon, and an insulating arm 22 carried by the rod constantly urges the rod upwardly so that the rod bears against the under surface of the hood. The arm 22 bears a contact 23 which when the plunger moves upwardly beyond the limit defined by the hood 11, comes into contact with a contact 24 carried and operated from the casing wall. This switch receives its supply from the battery circuit of the vehicle at any convenient point.

While it is obvious that the switch may be connected to the battery circuit at any convenient point it is preferable to connect the circuit with the starter (not shown) so that in case the circuit is shorted in any way the lamps will be illuminated just the same, when it is necessary to remedy any trouble with the motor.

It will be obvious that when for any reason the hood section at either side of the wall is elevated to inspect the motor to supply the same with oil or for any other reason, the plunger at that side of the motor compartment will elevate, closing the circuit to the lamp at the same side of the motor. When the hood is lowered the circuit of the lamp is re-opened. In order that there may be no wasteful utilization of the lamps a manually controlled switch 25 may be placed in the circuit as diagrammatically illustrated.

The opposite ends of the supporting rod S have downturned angular ends provided with balls or spherical members 15a, against which opposite clamps 15b are held by bolts 15d. These clamps have their lower interior surfaces threaded to engage with the threads 15g of the hanger tubes 15h. These tubes 15h support the reflectors 15k. The lower ends of the hanger tubes are provided with sockets 16 previously mentioned, and into which the usual plugs 16a of the bulbs 16b are engaged in the usual conventional manner. Also the bottom of the sockets 16 have holders 16d for the spring tensioned contact pins 16g. These holders comprise the metal tubes 16h mounted in insulating sleeves 16k, and held in there by screws 16m. Suitable conductors 17b connect in any well known manner (not shown) to the plugs 17d, in order to carry current to the contact pins 16g. The plug ends 16a of the bulbs 16b have contacts 18a to engage with the spring tensioned contact pins 16g.

Obviously the particular mounting method illustrated may be considerably modified as may the type of switch employed, any plunger switch being suitable for this purpose.

The invention having been set forth, what is claimed is:

1. In a motor vehicle, a motor compartment, rods extending longitudinally of said compartment, a motor substantially paralleling the rods, a transverse supporting rod having down-turned opposite ends, lamps having universal connections with the down-turned ends for the illumination of opposite sides of the motor, said universal connections permitting the lamps to be individually inclined toward the front or the rear to likewise direct the light rays, means for suspending the transverse supporting rod from the longitudinal rods, said suspension means being adjustable on the longitudinal rods, said transverse supporting rod being adjustable longitudinally through the suspension means and transversely of the motor, hinge covers for said compartment each movable to expose one side of the motor, and means operated by either of said covers to expose the motor for activating the lamp at the corresponding side of the motor, said last named means comprising an electric circuit normally open when said covers are closed, a contact terminal in said circuit, a movable contact terminal in the circuit, a support carrying both contact terminals, a movable element guided through said support and carrying said movable contact and held in a position by the cover with the two contact terminals out of engagement, and means for imparting movement to the element when the cover is raised to allow the movable contact terminal to engage with the first contact terminal for closing said circuit.

2. In a motor vehicle, a motor compartment, rods extending longitudinally of said compartment, a motor substantially paralleling the rods, a transverse supporting rod having down-turned opposite ends, lamps having universal connections with the down-turned ends for the illumination of opposite sides of the motor, said universal connections permitting the lamps to be inclined toward the front or the rear to likewise direct the light rays, means for suspending the transverse supporting rod from the longitudinal rods, said suspension means being adjustable on the longitudinal rods, said transverse supporting rod being adjustable longitudinally through the suspension means and transversely of the motor, said suspension means comprising upper and lower clamps, the latter being capable of pivotal movement relative to the former, hinge covers for said compartment each movable to expose one side of the motor, and means operated by either of said covers to expose the motor for activating the lamp at the corresponding side of the motor, said last named means comprising an electric circuit normally open when said covers are closed, a contact terminal in said circuit, a movable contact terminal in the circuit, a support carrying both contact terminals, a movable element guided through said support and carrying said movable contact and held in a position by the cover with the two contact terminals out of engagement, and means for imparting movement to the element when the cover is raised to allow the movable contact terminal to engage with the first contact terminal for closing said circuit.

ALBERT STUMPF.